United States Patent
Ruan et al.

(10) Patent No.: US 12,521,681 B2
(45) Date of Patent: Jan. 13, 2026

(54) LARGE-SCALE FABRICATION TECHNIQUE FOR PIM-1 ASYMMETRIC MEMBRANES DOPED WITH LOW-MOLECULAR-WEIGHT POLYETHYLENE GLYCOL FOR GAS SEPARATION

(71) Applicant: DALIAN UNIVERSITY OF TECHNOLOGY, Dalian (CN)

(72) Inventors: Xuehua Ruan, Dalian (CN); Gaohong He, Dalian (CN); Weixiang Fan, Dalian (CN); Jiaming Wang, Dalian (CN); Wenji Zheng, Dalian (CN); Xiaobin Jiang, Dalian (CN); Xiaoming Yan, Dalian (CN); Wu Xiao, Dalian (CN); Qinzheng He, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 208 days.

(21) Appl. No.: 18/570,497

(22) PCT Filed: May 29, 2023

(86) PCT No.: PCT/CN2023/096847
§ 371 (c)(1),
(2) Date: Dec. 14, 2023

(87) PCT Pub. No.: WO2024/152496
PCT Pub. Date: Jul. 25, 2024

(65) Prior Publication Data
US 2025/0091015 A1    Mar. 20, 2025

(30) Foreign Application Priority Data
Jan. 19, 2023 (CN) .......................... 202310061094.2

(51) Int. Cl.
*B01D 67/00*    (2006.01)
*B01D 53/22*    (2006.01)
(Continued)

(52) U.S. Cl.
CPC ....... *B01D 67/0013* (2013.01); *B01D 53/228* (2013.01); *B01D 67/00091* (2022.08);
(Continued)

(58) Field of Classification Search
CPC .................................................. B01D 53/228
See application file for complete search history.

(56) References Cited

U.S. PATENT DOCUMENTS

2013/0146538 A1\*    6/2013    Liu .................. B01D 71/82
                                                    95/47

FOREIGN PATENT DOCUMENTS

| CN | 108854604 A | 11/2018 |
| CN | 113578068 A | 11/2021 |

(Continued)

OTHER PUBLICATIONS

Wu, Xin & Zhang, Qiu-Qen & Lin, Peng & Qu, Yan & Zhu, Aimei & Liu, Qing Lin. (2015). Towards enhanced CO2 selectivity of the PIM-1 membrane by blending with polyethylene glycol. Journal of Membrane Science. 493. 147-155. https://doi.org/10.1016/j.memsci. 2015.05.077 (Year: 2015).\*

(Continued)

*Primary Examiner* — John J DeRusso
(74) *Attorney, Agent, or Firm* — MUNCY, GEISSLER, OLDS & LOWE, P.C.

(57) ABSTRACT

A fabrication technique for PIM-1 asymmetric membranes doped with polyethylene glycol for gas separation includes the following steps. Firstly, the coagulation process of casting solution is regulated by polyethylene glycol to thin the dense layer, to improve the hydrophilicity of the mem-
(Continued)

brane structure, and to form mass transfer channels for the diffusion of polyethylene glycol into the dense layer. Then, directional migration and enrichment of polyethylene glycol are realized through capillary action induced by directional water evaporation for fabrication of PIM-1 asymmetric membranes doped with polyethylene glycol in the dense layer for gas separation.

2 Claims, 2 Drawing Sheets

(51) Int. Cl.
*B01D 69/02* (2006.01)
*B01D 71/52* (2006.01)

(52) U.S. Cl.
CPC ...... *B01D 67/0011* (2013.01); *B01D 67/0016* (2013.01); *B01D 67/0095* (2013.01); *B01D 69/02* (2013.01); *B01D 71/5211* (2022.08); *B01D 71/522* (2022.08); *B01D 2323/081* (2022.08); *B01D 2323/082* (2022.08); *B01D 2323/12* (2013.01); *B01D 2323/2185* (2022.08); *B01D 2323/26* (2013.01); *B01D 2323/42* (2013.01); *B01D 2325/0231* (2022.08); *B01D 2325/0233* (2022.08); *B01D 2325/04* (2013.01); *B01D 2325/20* (2013.01)

(56) References Cited

FOREIGN PATENT DOCUMENTS

| CN | 116078193 A | 5/2023 |
|---|---|---|
| WO | WO 2011026541 A1 | 3/2011 |

OTHER PUBLICATIONS

Bengtson, G., Neumann, S., & Filiz, V. (2017). Membranes of Polymers of Intrinsic Microporosity (PIM-1) Modified by Poly(ethylene glycol). Membranes, 7(2), 28. https://doi.org/10.3390/membranes7020028 (Year: 2017).*

* cited by examiner

LARGE-SCALE FABRICATION TECHNIQUE FOR PIM-1 ASYMMETRIC MEMBRANES DOPED WITH LOW-MOLECULAR-WEIGHT POLYETHYLENE GLYCOL FOR GAS SEPARATION

TECHNICAL FIELD

The present invention relates to a large-scale fabrication technique for PIM-1 asymmetric membranes doped with low-molecular-weight polyethylene glycol for gas separation, which belongs to petroleum and chemical engineering fields. The method realizes directional migration and enrichment of low-molecular-weight polyethylene glycol through capillary action induced by directional water evaporation for large-scale fabrication of PIM-1 asymmetric membranes doped with low-molecular-weight polyethylene glycol in the dense functional layer for gas separation, and the finally prepared membranes can achieve high permeation ability and selectivity simultaneously.

BACKGROUND

The permeation ability and the selectivity are the two critical parameters about separation performance of gas separation membranes. Higher permeation ability means greater processing ability, and higher selectivity means lower energy consumption. For membranes with asymmetric structure in industrial gas separation applications, the permeation ability depends on the intrinsic permeability of membrane materials and the thickness of dense functional layer. The selectivity depends on the intrinsic selectivity of membrane materials and the defect degree of dense functional layer. Generally speaking, both membrane material and membrane structure must be simultaneously considered during developing high-performance gas separation membranes.

PIM-1 is a polymer of intrinsic microporosity, and also a novel membrane material with high free volume and high gas permeation ability. For example, its nitrogen permeation coefficient is higher than 220 Barrer, methane permeation coefficient is higher than 300 Barrer, oxygen permeation coefficient is higher than 800 Barrer, hydrogen permeation coefficient is higher than 2500 Barrer and carbon dioxide permeation coefficient is higher than 5000 Barrer. In the case that PIM-1 could be fabricated into asymmetric membranes with dense functional layer for gas separation through dry/wet phase inversion technique, membrane modules for gas separation would achieve breakthrough development. In detail, gas permeation rates would be enhanced by 1-2 orders of magnitude in comparison with the existing membranes. However, the PIM-1-based gas separation membrane also has obvious deficiencies, and the main limitation is that the selectivity is not high enough. For example, the selectivity between oxygen and nitrogen is about 3.6, which is significantly lower than that of common membrane materials, e.g., polyimide and polysulfone; the selectivity between carbon dioxide and nitrogen is about 22.7, far lower than that of common membrane materials, e.g., polyether and poly (ionic liquid)s. On the whole, with the intent to develop gas separation membranes with high permeation ability and high selectivity simultaneously, PIM-1 should be doping and/or blending with other high performance membrane materials to overcome the limitation that the gas separation selectivity is not high enough.

Polyethylene glycol is a polymeric membrane material rich in ether-oxygen groups, and has high affinitive selectivity for carbon dioxide. The selectivity between carbon dioxide and nitrogen is higher than 60.0. After further modification with cross-linking, blending, and/or block copolymerization, the selectivity can be increased to 100.0 and even high. Polyethylene glycol has a wide distribution range of molecular weight. During industrial manufacturing, polyethylene glycol products can be classified according to their average molecular weight. The products with average molecular weight lower than 1500 Dalton are defined as low-molecular-weight products, otherwise defined as high-molecular-weight products. The low-molecular-weight products, usually existing in liquid status or waxy solid status, are poor in mechanical strength and stability, so that they can not be fabricated into gas separation membranes with high tolerance to the transmembrane pressure difference. The high-molecular-weight products, because molecular chains have high isotacticity and strong inter-chain interaction, are crystalline polymeric membrane materials and lacking in gas permeation ability. On the whole, gas separation membranes with polyethylene glycol blending or doping into other polymeric materials can inhibit molecular chain crystallization, improve gas permeation separation performance and mechanical stability, and thereby achieving the large-scale fabrication of high performance gas separation membranes.

After analyzing the intrinsic separation performance, it is found that PIM-1 and polyethylene glycol are highly complementary with each other in terms of selectivity, permeation ability and membrane formation ability. Therefore, it is expected that the PIM-1 asymmetric membranes doped with an appropriate amount of polyethylene glycol in the dense functional layer could achieve high selectivity and permeation ability simultaneously for gas separation. In order to fabricate the special membrane micro-structure mentioned above, the present invention proposes a large-scale fabrication technique for PIM-1 asymmetric membranes doped with low-molecular-weight polyethylene glycol for gas separation. A special handling means is introduced in the dry/wet phase inversion and the subsequent bake-out processes for membrane casting, so that an appropriate amount of low-molecular-weight polyethylene glycol can be doped in the dense functional layer of the PIM-1 asymmetric membrane structure, thereby achieving high gas permeation ability and selectivity simultaneously.

SUMMARY

The purpose of the present invention is to provide a large-scale fabrication technique for PIM-1 asymmetric membranes doped with low-molecular-weight polyethylene glycol for gas separation. Two main innovations are comprised in the present invention: 1) low-molecular-weight polyethylene glycol is added into PIM-1 phase inversion casting solution to improve hydrophilicity of the asymmetric membrane structure, meanwhile the mass transfer channels for the diffusion of low-molecular-weight polyethylene glycol is formed in the dense functional layer; 2) PIM-1 gas separation membrane with asymmetric structure is dried in the customized oven with directional water evaporation ability, in which the directional water evaporation and the incidental capillary action would drive the directional migration and enrichment of low-molecular-weight polyethylene glycol from the porous supporting layer to the dense functional layer in the asymmetric membrane structure, so as to conduct the large-scale fabrication for PIM-1 asymmetric membranes doped with an appropriate amount of low-molecular-weight polyethylene glycol in the dense functional layer for gas separation, thereby achieving high selectivity and permeation ability simultaneously.

The present invention is realized by the following specific technical solution:

A large-scale fabrication technique for PIM-1 asymmetric membranes doped with low-molecular-weight polyethylene glycol for gas separation comprises the following steps:

1) adding low-molecular-weight polyethylene glycol into the PIM-1 casting solution for phase inversion, and controlling the additive amount of polyethylene glycol within a concentration range of 0.1-4.0 wt %, wherein polyethylene glycol molecular weight is between 400 and 1500 Dalton, and one of the molecular chain end groups is hydroxyl group; and then, forming a plate-like PIM-1 asymmetric membrane structure through dry/wet phase inversion, with a dense functional layer on one side and a hierarchical porous supporting layer on the other side;

2) moving the PIM-1 asymmetric membrane structure formed in the first step into the nonsolvent coagulation environment mainly constituted with water for a retention time of 2-6 hours, so that the solvent for membrane casting can be removed from the PIM-1 asymmetric membrane structure; transferring the PIM-1 asymmetric membrane structure from the nonsolvent coagulation environment to the atmospheric environment, and simultaneously spraying the aqueous solution of low-molecular-weight polyethylene glycol which has a concentration range of 2.0-5.0 wt % on the surface on the side of hierarchical porous supporting layer, wherein polyethylene glycol molecular weight is between 400 and 1500 Dalton; keeping the dihedral angle between gravitational direction and transmembrane direction larger than 60 degrees for the PIM-1 asymmetric membrane structure during spraying process, so that the adhesion amount of polyethylene glycol solution on the PIM-1 asymmetric membrane structure could be controlled by gravity;

3) transferring the PIM-1 asymmetric membrane structure which has been fully sprayed with polyethylene glycol solution on one side to an oven customized with directional water evaporation ability, wherein the PIM-1 asymmetric membrane structure is outspreaded; making the side of the dense functional layer of the PIM-1 asymmetric membrane structure enter the oven environment specified with sub-atmospheric pressure and heating functions; controlling the vacuum degree and temperature to be respectively in the ranges of 0-20 kPa and 40-80° C. to promote water evaporation on the side of the dense functional layer; making the side of the hierarchical porous supporting layer enter the oven environment specified with humidification and cooling functions; controlling relative humidity and temperature to be respectively in the ranges of 80-100% and 20-35° C. to inhibit water evaporation on the side of the hierarchical porous supporting layer; through directional water evaporation mentioned above and the resultant capillary action, realizing the directional migration and enrichment of polyethylene glycol from the hierarchical porous supporting layer to the dense functional layer in the PIM-1 asymmetric membrane structure;

4) after directional migration and enrichment for polyethylene glycol, transferring the PIM-1 asymmetric membrane structures into a vacuum oven for deep dehydration; controlling the vacuum degree and temperature to be within the ranges of 0-80 kPa and 60-120° C. respectively, and the dehydration time to be not less than 8.0 hours; through conducting deep dehydration, inhibiting the migration of polyethylene glycol, and thereafter accomplishing the large-scale fabrication of PIM-1 asymmetric membranes with low-molecular-weight polyethylene glycol controllably doped in the dense functional layer for gas separation.

The oven customized with the function of directional water evaporation comprises a left-hand chamber, a right-hand chamber and an air circulation system; the two chambers are divided by the PIM-1 asymmetric membrane; the hierarchical porous supporting layer of the membrane faces the left-hand chamber and the dense functional layer faces the right-hand chamber, and the membrane could be handled with directional movement through the rollers located on the upper and the lower ends of the customized oven for orientation and traction; a cooling element is arranged in the left-hand chamber to create an environment with humidification and cooling functions; a heating element is arranged in the right-hand chamber to create an environment with sub-atmospheric pressure and heating functions; supporting rollers are installed in the right-hand chamber and highly attached to membrane surface with the function to locate and also support the membrane; the inlet and the outlet of the air circulation system are connected with the two chambers; a vacuum pump, a humidification tank and a cooler are arranged in sequence on the pipeline from the right-hand chamber to the left-hand chamber; and through the air circulation system hot air with low humidity in the right-hand chamber is converted into cold air with high humidity in the left-hand chamber.

The present invention has the following beneficial effects: low-molecular-weight polyethylene glycol is added into the PIM-1 casting solution, which can regulate the dry/wet phase inversion process, significantly thin the dense functional layer (about 1.1 μm), and greatly reduce the gas permeation resistance. In addition, the additive agent of low-molecular-weight polyethylene glycol can also improve the hydrophilicity of the asymmetric membrane structure, and simultaneously form the mass transfer channel for the diffusion of polyethylene glycol into the dense functional layer. The present invention realizes directional migration and enrichment of low-molecular-weight polyethylene glycol from the hierarchical porous supporting layer to the dense functional layer through directional water evaporation and the incidental capillary action. This practice can construct the dense functional layer controllably doped with an appropriate amount of low-molecular-weight polyethylene glycol to greatly improve the selectivity during permeation, and reduce the amount of low-molecular-weight polyethylene glycol remaining in the hierarchical porous supporting layer to avoid excessive increase in mass transfer resistance during gas separation. On the whole, the custom-made fabrication technique in the present invention is expected for large-scale fabrication of PIM-1 asymmetric membranes doped with an appropriate amount of low-molecular-weight polyethylene glycol in the dense functional layer for gas separation, and then achieves high gas permeation ability and selectivity simultaneously. Taking coal-fired flue gas as an example, the selectivity between carbon dioxide and nitrogen in the novel gas separation membrane may exceed 68.5, and the permeation rate of carbon dioxide may exceed 2230 GPU.

In the figures: ① box shell of the customized oven; ② cooling element; ③ supporting rollers for membrane; ④ heating element; ⑤ traction rollers for membrane; ⑥ vacuum pump; ⑦ humidification tank; ⑧ cooler; ⑨ PIM-1 asymmetric membrane structure.

DETAILED DESCRIPTION

Specific embodiments of the present invention are further described below in combination with the drawings and the technical solution.

Embodiment 1

A PIM-1 membrane with asymmetric structure for gas separation is prepared through dry/wet phase inversion in embodiment 1. PIM-1 used in the embodiment is a polymeric membrane material synthesized with 5,5',6,6'-tetrahydroxy-3,3,3',3'-tetramethyl-1,1'-spirobisindane (TTSBI) and tetrafluoroterephtalonitrile (TFTPN), and the reaction is polycondensation. PIM-1 is a high free volume membrane material. The average molecular weight obtained by gel permeation chromatography analysis exceeds 65000 Dalton. The solvent system is a mixed solvent prepared by tetrahydrofuran (THF) and dimethylacetamide (DMAc), wherein the mass fraction of THF is about 75.0 wt %. The nonsolvent used for dry/wet phase inversion is deionized water.

PIM-1 is heated and dissolved in the mixed solvent prepared by THF and DMAc to prepare the phase inversion casting solution with a PIM-1 mass fraction of 8.0 wt %.

The PIM-1 phase inversion casting solution is uniformly spread out on non-woven fabric by blade coating to form a casting solution thin layer with a thickness not greater than 100 μm. Then, the casting solution thin layer remains in the atmospheric environment under room temperature with relative humidity less than 30 RH % for 6 seconds, and then it is transferred into the coagulation bath environment (mainly composed with deionized water) under room temperature. A plate-like PIM-1 asymmetric membrane structure is formed after solvent exchange, with the dense functional layer at one side and the hierarchical porous supporting layer at the other side.

The PIM-1 asymmetric membrane structure formed in the previous step is stored in the nonsolvent coagulation environment mainly constituted with water, and the retention time is given as 6 hours, so that the membrane casting solvent is removed from the membrane structure.

The PIM-1 asymmetric membrane structure after deep removing membrane casting solvent is transferred into the vacuum oven, the vacuum degree and the temperature are controlled to 10 kPa and 60° C. respectively for 0.5 hours, and the water is partially removed. Further, the vacuum degree and the temperature are adjusted to 50 kPa and 100° C. respectively, for not less than 8.0 hours. The water in the membrane structure is deeply removed, to obtain the ultimate morphology of the PIM-1 gas separation membrane with asymmetric structure.

Figure 1:
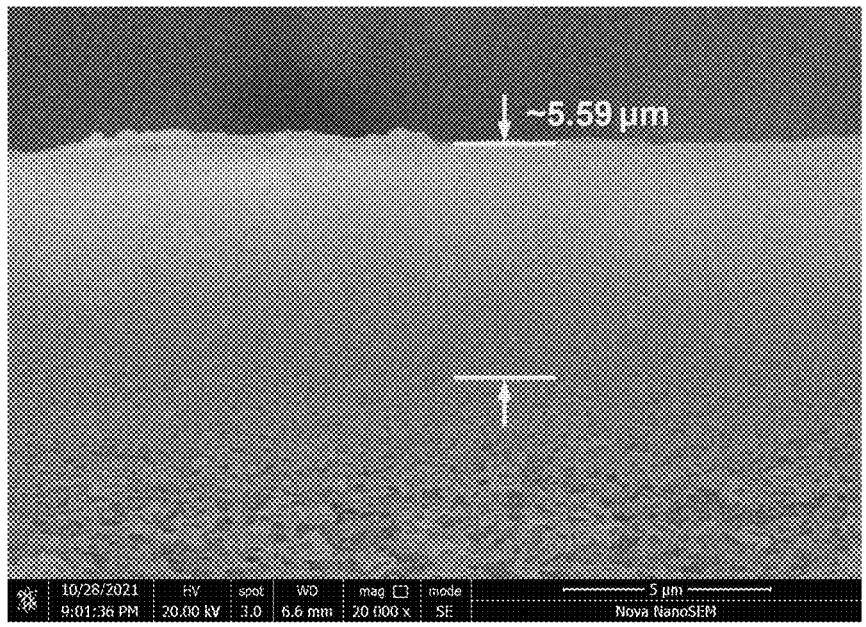
FIG. 1 is the SEM image of the PIM-1 asymmetric membrane structure prepared without adding low-molecular-weight polyethylene glycol into the casting solution.

SEM characterization is carried through for the PIM-1 gas separation membrane prepared in embodiment 1. The cross-sectional microstructure is shown in FIG. 1, and the thickness of the dense functional layer is about 5.59 μm. The permeation test indicates that the permeation rate of carbon dioxide is 640.3 GPU, the permeation rate of oxygen is 109.8 GPU and the permeation rate of nitrogen is 28.2 GPU, wherein the permeation selectivity between carbon dioxide and nitrogen is 22.7 and the permeation selectivity between oxygen and nitrogen is 3.89.

Embodiment 2

A PIM-1 membrane with asymmetric structure for gas separation is prepared through dry/wet phase inversion (an appropriate amount of low-molecular-weight polyethylene glycol is added into the casting solution) in embodiment 2. PIM-1 used in the embodiment is a polymeric membrane material synthesized with 5,5',6,6'-tetrahydroxy-3,3,3',3'-tetramethyl-1,1'-spirobisindane (TTSBI) and tetrafluoroterephtalonitrile (TFTPN), and the reaction is polycondensation. PIM-1 is a high free volume membrane material. The average molecular weight obtained by gel permeation chromatography analysis exceeds 65000 Dalton. The solvent system is a mixed solvent prepared by tetrahydrofuran (THF) and dimethylacetamide (DMAc), wherein the mass fraction of THF is 75.0 wt %. The nonsolvent used for dry/wet phase inversion is deionized water.

PIM-1 is heated and dissolved in the mixed solvent prepared by THF and DMAc to prepare a casting solution with a PIM-1 mass fraction of 8.0 wt %. Then, low-molecular-weight polyethylene glycol with the average molecular weight of 1000 Dalton is added into the casting solution, with a mass fraction of 3.0 wt %.

The PIM-1 phase inversion casting solution is uniformly spread out on non-woven fabric by blade coating to form a casting solution thin layer with a thickness of not greater than 100 μm. Then, the casting solution thin layer remains in the atmospheric environment under room temperature with relative humidity less than 30 RH % for 6 seconds, and then it is transferred into the coagulation bath environment (mainly composed with deionized water) under room temperature. A plate-like PIM-1 asymmetric membrane structure is formed after solvent exchange, with the dense functional layer at one side and the hierarchical porous supporting layer at the other side.

The PIM-1 asymmetric membrane structure formed in the previous step is stored in the nonsolvent coagulation environment mainly constituted with water, and the retention time is given as 6 hours, so that the membrane casting solvent is removed from the membrane structure.

Figure 2:
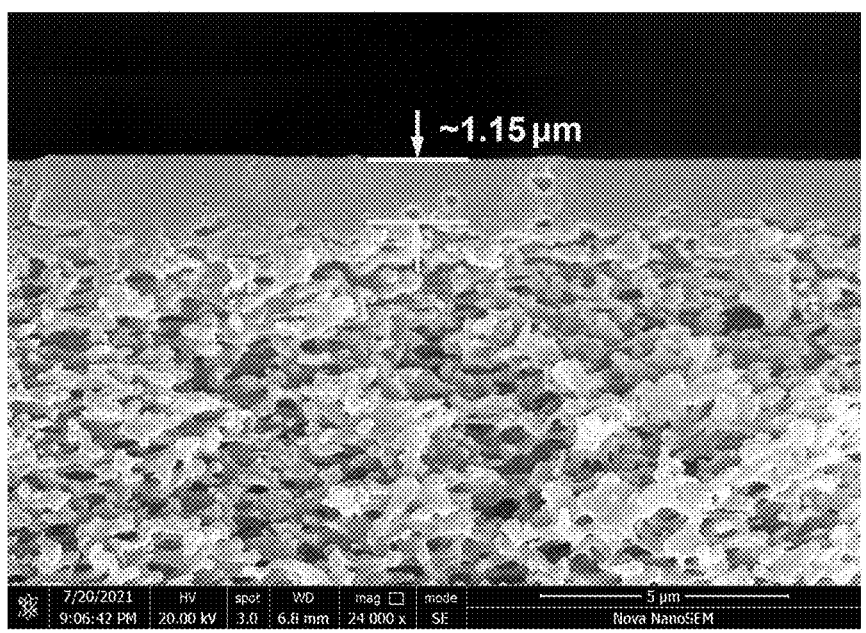
FIG. 2 is the SEM image of the PIM-1 asymmetric membrane structure prepared after adding low-molecular-weight polyethylene glycol into the casting solution.

The PIM-1 asymmetric membrane structure after deep removing membrane casting solvent is transferred into the vacuum oven, the vacuum degree and the temperature are controlled to 10 kPa and 60° C. respectively for 0.5 hours, and the water is partially removed. Further, the vacuum degree and the temperature are adjusted to 50 kPa and 100° C. respectively, for not less than 8.0 hours. The water in the membrane structure is deeply removed, to obtain the ultimate morphology of the PIM-1 gas separation membrane with asymmetric structure. SEM characterization is carried through for the PIM-1 gas separation membrane prepared in embodiment 2. The cross-sectional microstructure is shown in FIG. 2, and the thickness of the dense functional layer is about 1.15 μm. The permeation test indicates that the permeation rate of carbon dioxide is 3345.1 GPU, the permeation rate of oxygen is 599.7 GPU and the permeation rate of nitrogen is 154.7 GPU, wherein the permeation selectivity between carbon dioxide and nitrogen is 21.6 and the permeation selectivity between oxygen and nitrogen is 3.88.

Embodiment 3

A PIM-1 membrane with asymmetric structure for gas separation is prepared through dry/wet phase inversion (an appropriate amount of low-molecular-weight polyethylene glycol is added into the casting solution) in embodiment 3. Thereafter, the gas separation performance of the membrane is enhanced by doping low-molecular-weight polyethylene glycol in the dense functional layer by directional water evaporation. PIM-1 used in the embodiment is a polymeric membrane material synthesized with 5,5',6,6'-tetrahydroxy-3,3,3',3'-tetramethyl-1,1'-spirobisindane (TTSBI) and tetrafluoroterephtalonitrile (TFTPN), and the reaction is polycondensation. PIM-1 is a high free volume membrane material. The average molecular weight obtained by gel permeation chromatography analysis exceeds 65000 Dalton. The solvent system is a mixed solvent prepared by tetrahydrofuran (THF) and dimethylacetamide (DMAc), wherein the mass fraction of THF is 75.0 wt %. The nonsolvent used for dry/wet phase inversion is deionized water.

PIM-1 is heated and dissolved in the mixed solvent prepared by THF and DMAc to prepare a casting solution with a PIM-1 mass fraction of 8.0 wt %. Then, low-molecular-weight polyethylene glycol with the average molecular weight of 1000 Dalton is added into the casting solution, with a mass fraction of 3.0 wt %.

The PIM-1 phase inversion casting solution is uniformly spread out on non-woven fabric by blade coating to form a casting solution thin layer with a thickness of not greater than 100 μm. Then, the casting solution thin layer remains in the atmospheric environment under room temperature with relative humidity less than 30 RH % for 6 seconds, and then it is transferred into the coagulation bath environment (mainly composed with deionized water) under room temperature. A plate-like PIM-1 asymmetric membrane structure is formed after solvent exchange, with the dense functional layer at one side and the hierarchical porous supporting layer at the other side.

The PIM-1 asymmetric membrane structure formed in the previous step is stored in the nonsolvent coagulation environment mainly constituted with water, and the retention time is given as 6 hours, so that the membrane casting solvent is removed from the membrane structure.

The PIM-1 asymmetric membrane structure is transferred from the nonsolvent coagulation environment to the atmospheric environment, and then the solution of low-molecular-weight polyethylene glycol which has a concentration range of 2.0-5.0 wt % is sprayed on the surface on the side of hierarchical porous supporting layer. During the spraying process, the dihedral angle between gravitational direction and transmembrane direction is kept larger than 60 degrees for the PIM-1 asymmetric membrane structure, so that the adhesion amount of the aqueous solution of polyethylene glycol on the membrane structure can be controlled by gravity.

The PIM-1 asymmetric membrane structure sprayed with the aqueous solution of polyethylene glycol fully on one side is transferred to the oven customized with directional water evaporation ability. The membrane structure should be outspreaded. The side of the dense functional layer of the PIM-1 asymmetric membrane structure enters the oven environment specified with sub-atmospheric pressure and heating functions. The vacuum degree and the temperature are controlled respectively to be 20 kPa and 60° C. to promote water evaporation on the side of the dense functional layer. The side of the hierarchical porous supporting layer enters the oven environment specified with humidification and cooling functions. The relative humidity and the temperature are controlled to be 95 RH % and 25° C., respectively, so that water evaporation on the side of the hierarchical porous supporting layer can be inhibited. The retention time of the PIM-1 asymmetric membrane structure in the oven with directional water evaporation ability is controlled to be 1.0 hour.

After directional migration and enrichment for polyethylene glycol, the PIM-1 asymmetric membrane structure is transferred into an ordinary vacuum oven; the vacuum degree is controlled to be 50 kPa and the temperature is controlled to be 100° C.; and duration time exceeds 8.0 hours. The water in the membrane structure is deeply removed, to obtain the ultimate morphology of the PIM-1 gas separation membrane. In detail, this kind of PIM-1 membranes has an asymmetric structure and a dense functional layer doped with low-molecular-weight polyethylene glycol.

Figure 3:
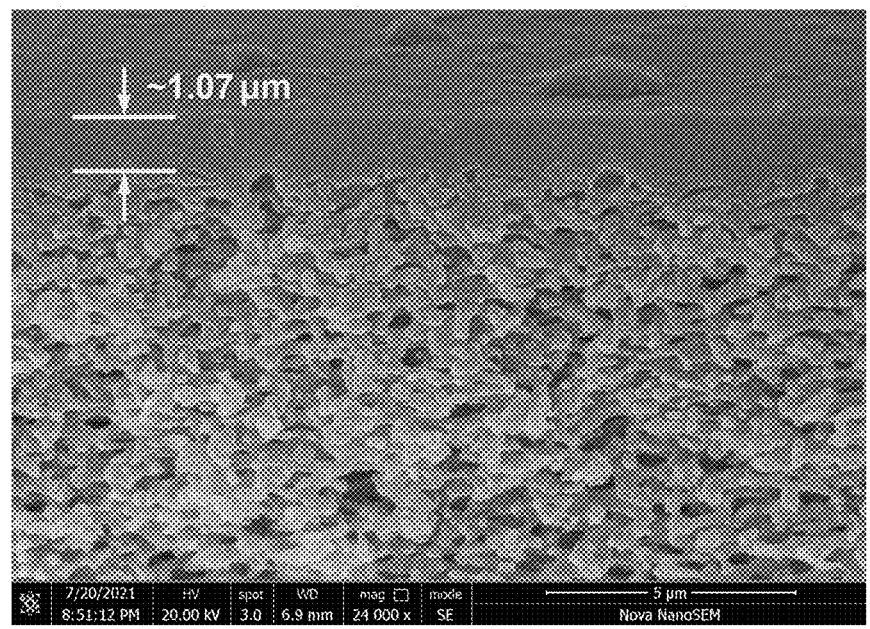
FIG. 3 is the SEM image of the PIM-1 asymmetric membrane doped with low-molecular-weight polyethylene glycol in the dense layer for gas separation.
Figure 4:
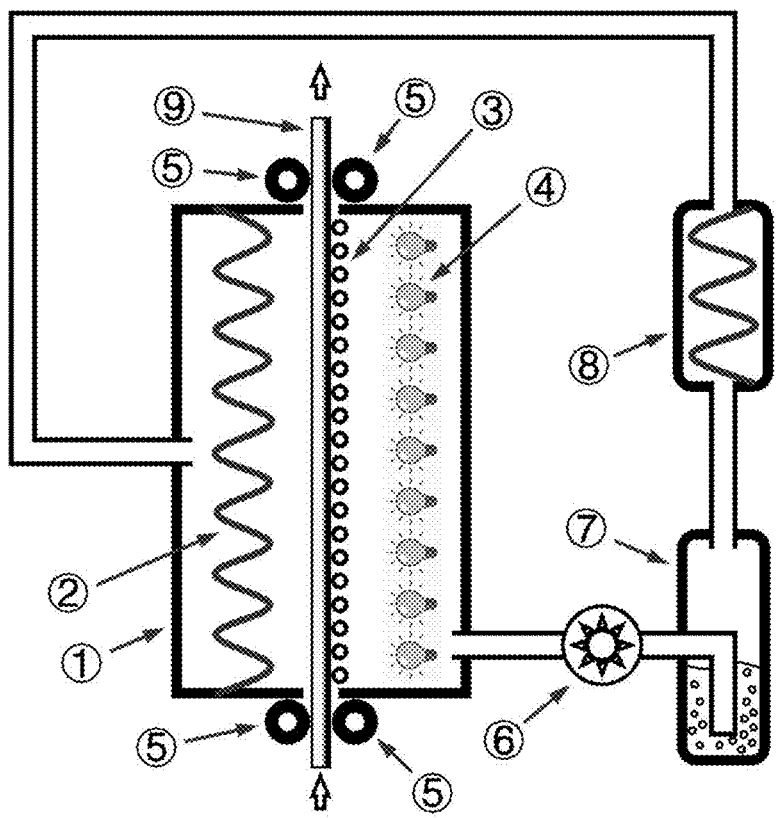
FIG. 4 is the schematic structure diagram of the oven with directional water evaporation function.

SEM characterization is carried through for the PIM-1 gas separation membrane doped with low-molecular-weight polyethylene glycol prepared in embodiment 3. The cross-sectional microstructure is shown in FIG. 3, and the thickness of the dense functional layer is about 1.07 μm. Because the processes of dry/wet phase inversion are basically the same for embodiment 3 and embodiment 2, the membranes prepared by the two embodiments have similar microstructure and dense layer thickness.

The gas permeation ability test indicates that the performance of the PIM-1 asymmetric gas separation membrane is significantly changed by doping low-molecular-weight polyethylene glycol in the dense functional layer through the process of directional water evaporation; the permeation rate of carbon dioxide is 2230.5 GPU, the permeation rate of oxygen is 179.1 GPU and the permeation rate of nitrogen is 32.5 GPU, wherein the permeation selectivity between carbon dioxide and nitrogen is 68.6 and the permeation selectivity between oxygen and nitrogen is 5.5. Compared with the membrane sample not doped with low-molecular-weight polyethylene glycol in the dense functional layer in embodiment 2, the permeation ability of the PIM-1 asymmetric gas separation membrane prepared in embodiment 3 is reduced, but the selectivity is significantly improved.

The invention claimed is:

1. A fabrication technique for PIM-1 asymmetric membranes doped with polyethylene glycol for gas separation, comprising the following steps:
    1) adding polyethylene glycol into a PIM-1 casting solution for phase inversion, and controlling the additive amount of polyethylene glycol within a concentration range of 0.1-4.0 wt %, wherein polyethylene glycol molecular weight is between 400 and 1500 Dalton, and one of the molecular chain end groups is hydroxyl group; and then, forming a plate-like PIM-1 asymmetric membrane structure through dry/wet phase inversion, with a dense layer on one side and a porous support layer on the other side;
    2) moving the PIM-1 asymmetric membrane structure formed in the first step into a nonsolvent coagulation environment constituted with water for a retention time of 2-6 hours, so that the solvent for membrane casting is removed from the PIM-1 asymmetric membrane structure; transferring the PIM-1 asymmetric membrane structure from the nonsolvent coagulation environment to an atmospheric environment, and simultaneously spraying an aqueous solution of polyethylene glycol which has a concentration range of 2.0-5.0 wt % on the surface on the side of porous support layer, wherein polyethylene glycol molecular weight is between 400 and 1500 Dalton; keeping the dihedral angle between gravitational direction and transmembrane direction larger than 60 degrees for the PIM-1 asymmetric membrane structure during spraying process, so that the adhesion amount of polyethylene glycol solution on the PIM-1 asymmetric membrane structure is controlled by gravity;

3) transferring the PIM-1 asymmetric membrane structure which has been sprayed with polyethylene glycol solution on one side to an oven with directional water evaporation ability, wherein the PIM-1 asymmetric membrane structure is outspreaded; making the side of the dense layer of the PIM-1 asymmetric membrane structure enter the oven environment specified with sub-atmospheric pressure and heating functions; controlling the vacuum degree and temperature to be respectively in the ranges of 0-20 kPa and 40-80° C. to promote water evaporation on the side of the dense layer; making the side of the porous support layer enter the oven environment specified with humidification and cooling functions; controlling relative humidity and temperature to be respectively in the ranges of 80-100% and 20-35° C. to inhibit water evaporation on the side of the porous support layer; through directional water evaporation and the resultant capillary action, realizing the directional migration and enrichment of polyethylene glycol from the porous support layer to the dense layer in the PIM-1 asymmetric membrane structure;

4) after directional migration and enrichment with polyethylene glycol, transferring the PIM-1 asymmetric membrane structure into a vacuum oven for dehydration; controlling the vacuum degree and temperature to be within the ranges of 0-80 kPa and 60-120° C. respectively, and the dehydration time to be not less than 8.0 hours; through conducting dehydration, inhibiting the migration of polyethylene glycol, accomplishing the large-scale fabrication of a PIM-1 asymmetric membrane with polyethylene glycol controllably doped in the dense layer for gas separation.

2. The fabrication technique for PIM-1 asymmetric membranes doped with polyethylene glycol for gas separation, according to claim 1, wherein the oven with the directional water evaporation ability comprises a chamber A, a chamber B and an air circulation system; the two chambers are divided by the PIM-1 asymmetric membrane structure; the porous support layer of the membrane faces the chamber A and the dense layer faces the chamber B, and the membrane is handled with directional movement through rollers located on the upper and the lower ends of the oven for orientation and traction; a cooling element is arranged in the chamber A to create an environment with humidification and cooling functions; a heating element is arranged in the chamber B to create an environment with sub-atmospheric pressure and heating functions; supporting rollers are installed in the chamber B and attached to membrane surface with the function to locate and also support the membrane; an inlet and an outlet of the air circulation system are connected with the two chambers; a vacuum pump, a humidification tank and a cooler are arranged in sequence on a pipeline from the chamber B to the chamber A.

* * * * *